Jan. 23, 1962 W. E. CHEELEY 3,017,729
SHRINKABLE CONTAINER CLOSURE AND MANUFACTURE THEREOF
Filed May 26, 1959 5 Sheets-Sheet 1
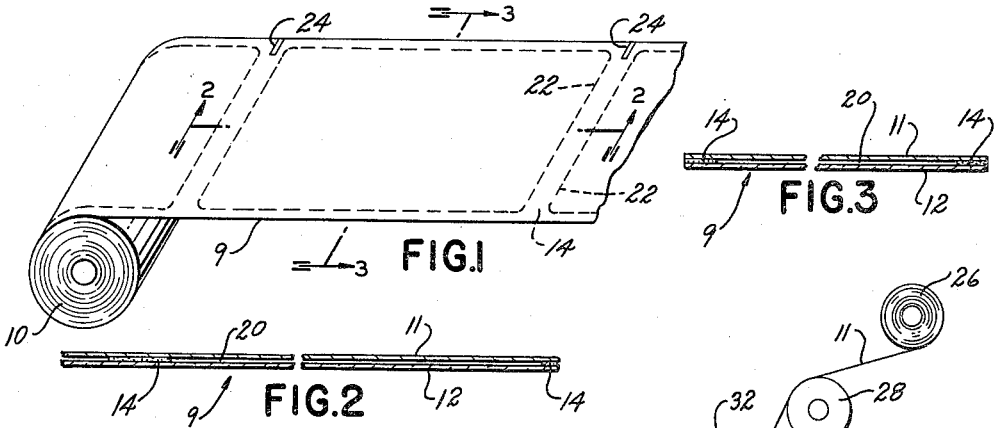
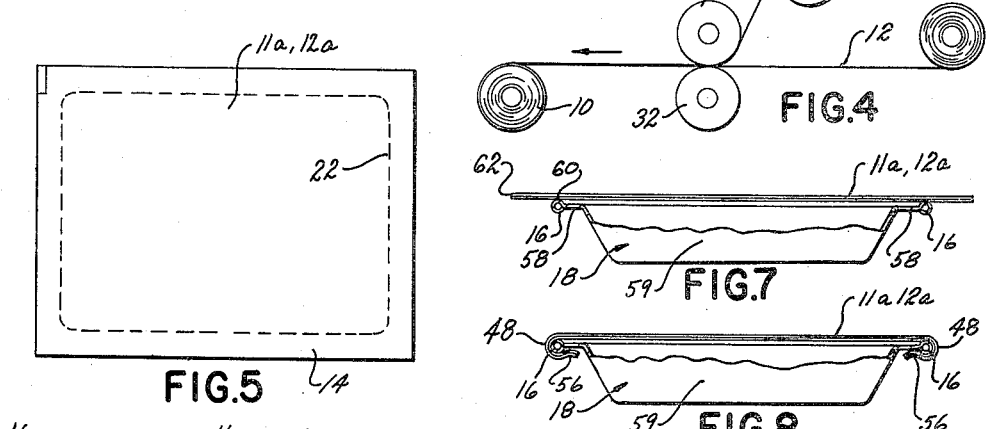
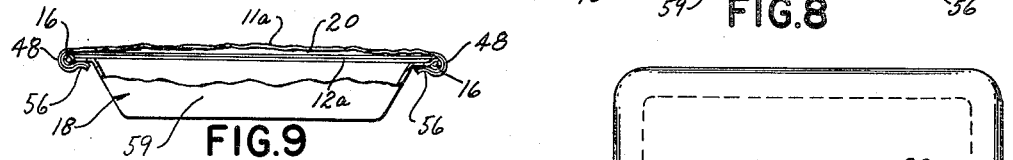
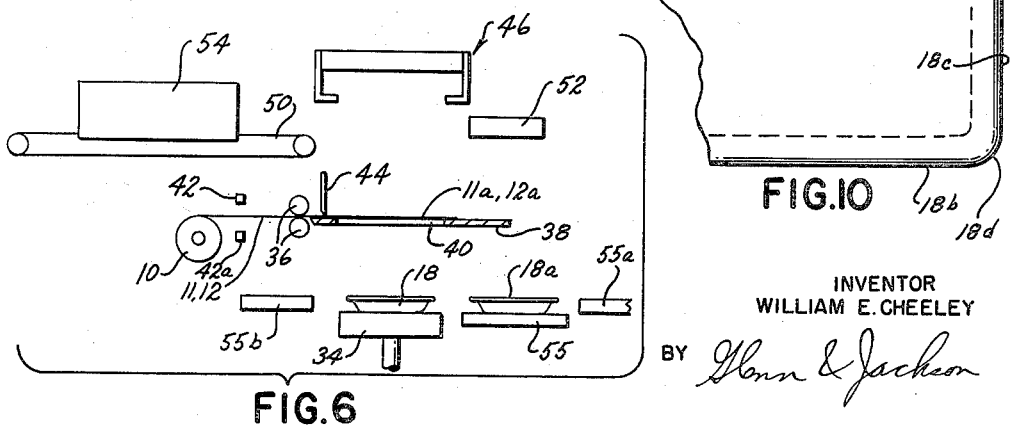
INVENTOR
WILLIAM E. CHEELEY
BY *Glenn & Jackson*
HIS ATTORNEYS

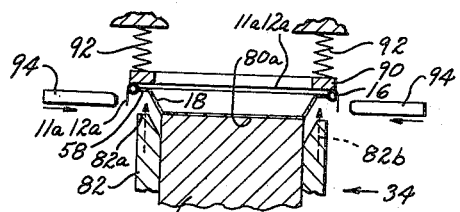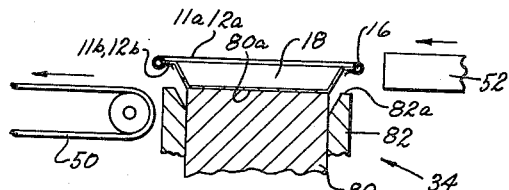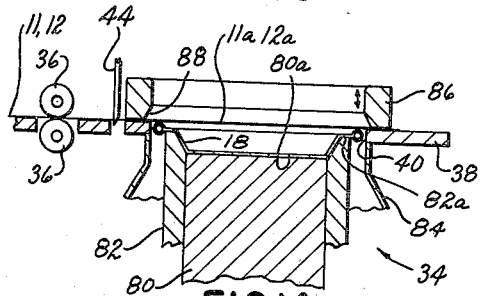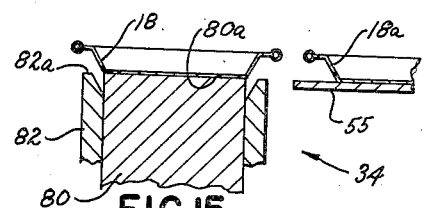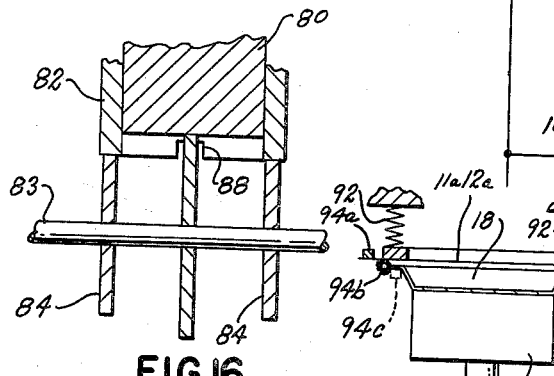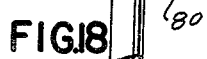

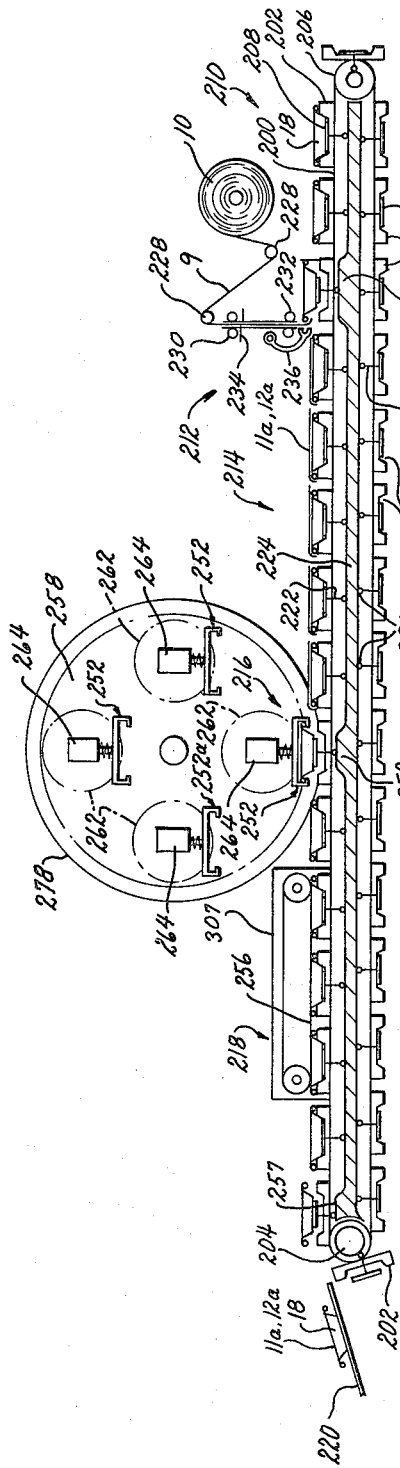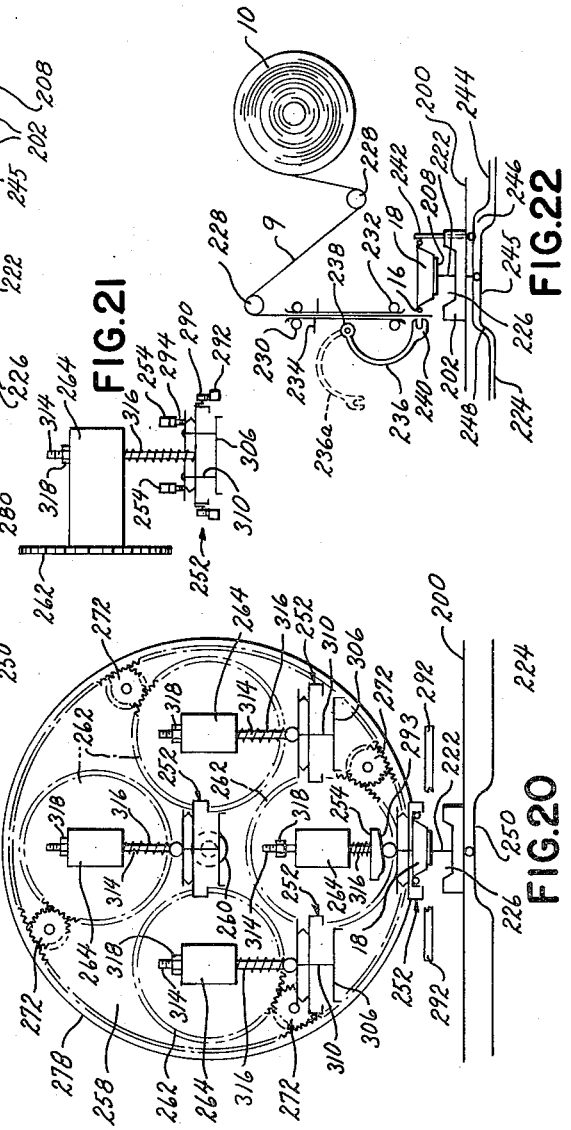

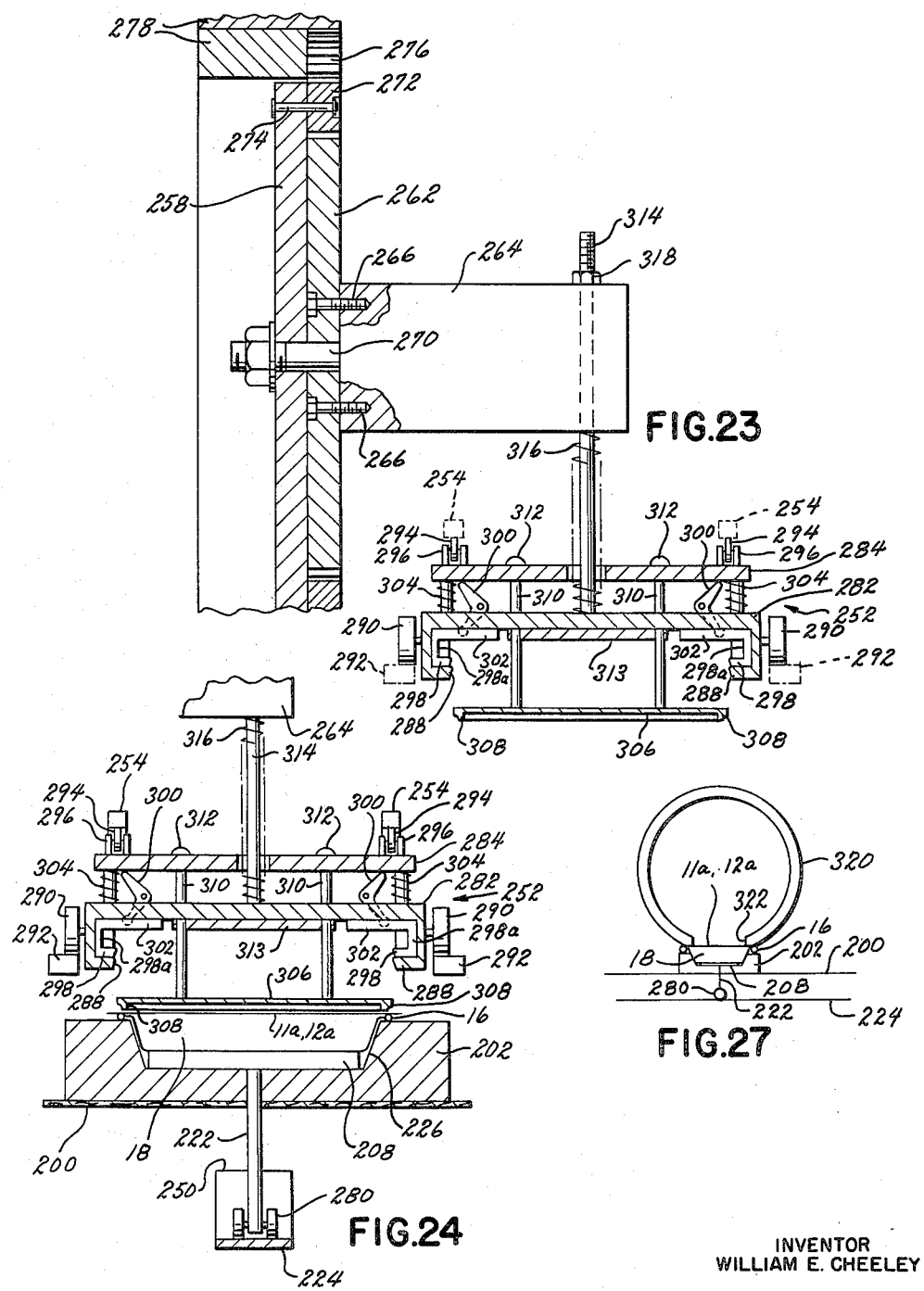

Jan. 23, 1962 W. E. CHEELEY 3,017,729
SHRINKABLE CONTAINER CLOSURE AND MANUFACTURE THEREOF
Filed May 26, 1959 5 Sheets-Sheet 5

INVENTOR
WILLIAM E. CHEELEY

BY *Glenn & Jackson*

HIS ATTORNEYS

United States Patent Office 3,017,729
Patented Jan. 23, 1962

3,017,729
SHRINKABLE CONTAINER CLOSURE AND
MANUFACTURE THEREOF
William E. Cheeley, Bon Air, Va., assignor to Reynolds
Metals Company, Richmond, Va., a corporation of
Delaware
Filed May 26, 1959, Ser. No. 815,990
20 Claims. (Cl. 53—27)

This invention relates to the covering and sealing of thin metallic receptacles of the type generally made of thin sheet metal, such as aluminum or aluminum alloys.

The receptacles particularly adapted to be covered and sealed by the practice of this invention are of the beaded type preferably with a flat rim between the bead and the content cavity of the receptacle.

A strip is formed with an outer, or upper, protective, metal foil made of aluminum or its alloys, for example, and an inner, or lower, heat shrinkable film. The foil and film are secured together only in a series of zones substantially corresponding in pattern to the outer bead or other opening perimeter of the series of receptacles to be covered. The foil and film are free from each other and not secured together inside the above zones. The foil cover acts as a carrier for the shrinkable film. The strip is then cut along an edge of each of said zones, into a plurality of sheets. These sheets are serially applied with the film contacting the beads of the receptacles, and then the sheets are curled around the beads loosely to cover the receptacles. The covered receptacles are then heated to cause the film to be pulled tightly against the beads to seal the cover to the bead. The glued area bonding the foil and film corresponding to the container perimeter holds the film under the bead when the cover is applied. It is an object of this invention to provide receptacles covered in this manner, and to provide methods and apparatus for producing such receptacles.

This invention permits the use of a smooth quantity production line in which many of the operations are performed in machinery which is controlled automatically, and it is an object of this invention to provide machinery of this type.

The receptacle bead is secured to and is outside of the flat rim of the receptacle. The bead and rim form a laterally disposed beam or "truss" which prevents inward collapse or excessive bowing of the receptacle, particularly along the sides of multisided or rectangular receptacles. Such collapse or excessive bowing tends to occur under the inward pull of the film when it tends to shrink when heated. The combination of the bead, rim, and heat shrinkable film cooperate to produce a tightly sealed joint at the bead. Hence it is an object of this invention to provide a method, machine, and product embodying these advantages.

Other objects and advantages of this invention will become apparent as the description proceeds with reference to the accompanying drawings, in which:

FIGURE 1 is a perspective view showing a strip embodying features of this invention.

FIGURES 2 and 3 are cross sections taken respectively along the lines 2—2 and 3—3 of FIGURE 1.

FIGURE 4 is a diagrammatic view illustrating apparatus and method for producing the strip of FIGURES 1-3.

FIGURE 5 is a top view of a cover sheet severed from the strip of FIGURES 1-3.

FIGURE 6 is a diagrammatic representation illustrating apparatus and methods for serially covering receptacles with the strip shown in FIGURES 1-3.

FIGURES 7, 8 and 9 are diagrammatic cross sections illustrating various covering steps performed in the apparatus and methods of FIGURE 6.

FIGURE 10 is a top plan view of FIGURE 9.

FIGURE 11 is a plan view showing a modification of a portion of FIGURE 6 adapted to cover circular, oblong and similarly shaped receptacles.

FIGURES 12–16 show vertical cross sections of more detailed embodiments of portions of FIGURE 6.

FIGURE 17 shows a wiring diagram to control the embodiment of FIGURES 6 and 12–16.

FIGURE 18 shows another embodiment of the means for curling the sheets around the beads of the receptacles, and adapted for use with the embodiment of FIGURE 6.

FIGURE 19 is a diagrammatic showing of another embodiment of apparatus and methods for serially covering receptacles with the strip shown in FIGURES 1-3.

FIGURE 20 is a slightly enlarged and more detailed showing of part of FIGURE 19.

FIGURE 21 is a transverse cross section of part of FIGURE 20.

FIGURE 22 is a slightly enlarged and more detailed showing of another part of FIGURE 19.

FIGURE 23 is a further enlargement and more detailed showing of FIGURE 21.

FIGURE 24 shows the position of the die of FIGURE 23 as it approaches a mould and receptacle of FIGURE 19 for covering the receptacle.

FIGURE 27 is a diagrammatic showing of another heating means to be used in the apparatus of FIGURE 19.

Figure 25:
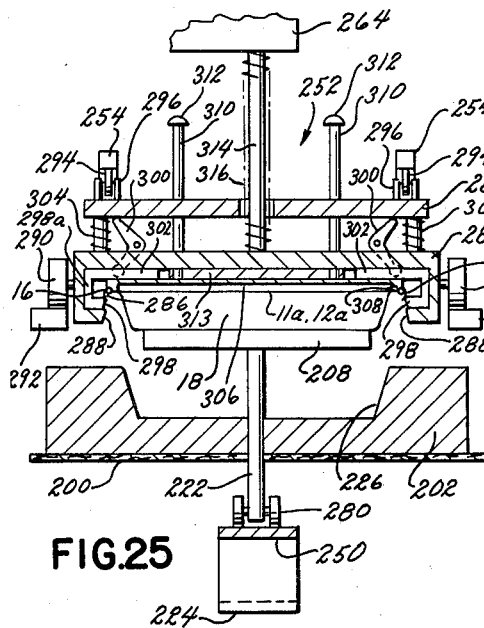
FIGURE 25 shows a step subsequent to that of FIGURE 24.

According to this invention a roll 10 is specially prepared to provide a laminated sheet 9 composed of aluminum foil 11 and the heat shrinkable film 12. The foil 11 may be a metal, or aluminum, or aluminum alloy foil of .001" gauge, more or less, as desired. The heat shrinkable film 12 may be a film .001" to .008" in thickness, more or less. The film is of the type which is heated and stretched in one, two (perpendicular) or more directions parallel to its flat surface and then cooled and set in such stretched condition. The stretched film then shrinks or contracts, or tends to shrink or contract if permitted to do so, to its original dimensions when heated again to a suitable temperature, such as at or above the stretching temperature. Films of this character, for example, may be made of stabilized rubber hydrochloride, asymmetrical amorphous rubber chloride, plasticized polyvinyl chloride or vinylidene chloride, or a plasticized copolymer of vinyl acetate and formaldehyde, as variously described in such patents as Calvert, 1,989,632, January 29, 1935; McCoy, 2,168,651, August 8, 1939, and Goodman, 2,420,310, May 13, 1947. Films of this character are known in the trade by such names as "Pliofilm," "Formvar," "Snug Pak," "Cryovac," "Seran," etc.

The foil 11 is specially laminated or adhesively secured to the film 12 preferably at a series of zones 14 only. The zones 14 coincide with, or surround, the respective beads 16 of the receptacles 18 to be covered by the lamination 11, 12, while leaving the foil and film in central zones 20 unadhered to each other.

The foil 11 may have advertising copy indicated by line 22 printed thereon and an electric eye target 24 formed by printing a contrasting spot, or cutting a slot, in a manner properly to actuate an electric eye to control the sequential operations hereinafter described.

The special sheet 9 or lamination 11, 12 may be prepared in any desired manner. For example, a roll 26 is provided containing the foil 11 with the advertising copy 22 and electric eye target 24 previously placed thereon. The roler 28 "prints" or applies a patterned film of suitable adhesive to the under side of the foil 11 which patterned film coincides with the zone 14 heretofore described. (Alternatively or additionally a similarly patterned adhesive film may be applied to the film 12.) The roll 30 supplies the shrinkable film 12. The foil 11 and film 12 are laminated, pressed, or adhesively secured together at zone 14 by the rolls 32 and fed into the roll 10. The roll 10 may then be reversed to be used as a source of supply for the receptacle capping or covering method or machine to be described.

The receptacle 18 may be substantially rectangular as indicated in FIGURE 10, or circular, or of any other desired design. For illustrative purposes, the capping or covering procedure is described and illustrated as applied to rectangular receptacles, it being understood that the procedure is also applicable to receptacles of other shapes or designs. The receptacles 18 may be made of aluminum or aluminum alloy sheet or foil of from .003" to .012" thickness, more or less, for example.

To cover the receptacles 18 (FIGURE 6), these receptacles are manualy or automatically serially fed on top of the vertically reciprocable elevating table 34, one receptacle at a time for each reciprocation of the table 34. The lamination 11, 12 is fed rightward from the roll 10 (or a roll subsequently produced from the roll 10) by means of the feed rolls 36. When a suitable length 11a, 12a of lamination has been fed over a shelf 38 having an opening 40, the electric eye 42, 42a stops the rolls 36. Then a complete cycle of covering operations is started automatically to cover a receptacle 18 and return the empty elevator table 34 to its original lower position ready to receive the next receptacle 18a to be covered, and again to start the feed rolls 36 in a manner to be described.

The electric eye 42, 42a may be responsive to a stoppage of reflection from a powerful light beam by the target 24, if the target is a dark, light absorbing spot on foil 11 or the eye 42, 42a may be responsive to the passage of the light beam through a slot in the foil 11 and through the transparent film 12, if the target 24 is such a slot. The particular eye which starts the cycle may be one or more patterns removed from the particular cover sheet 11a, 12a, to be cut.

The cycle of covering operations includes a lamination cutting operation performed by the knife construction diagrammatically indicated at 44. This cuts a sheet 11a, 12a, of proper length to cover the receptacle 18. The elevator table 34 raises the receptacle 18 up through the opening 40 to lift the sheet 11a, 12a, on its bead or rim 16, as indicated in FIGURE 7.

The elevator table 34 continues upwardly and lifts the receptacle 18 and sheet 11a, 12a into the rim curling or crimping die 46 which automatically curls the rim 48 of sheet 11a, 12a, around the bead 16 as illustrated in FIGURE 8. Such curling operation loosely covers the receptacle and prepares the receptacle and cover for a subsequent sealing operation.

The curling or crimping die 46 may be of any construction for loosely curling or crimping aluminum foil alone around the rim of containers.

After the curling operation in die 46, the elevator table 34, receptacle 18 and cover 11a, 12a in the condition shown in FIGURE 8 is lowered to a position in horizontal alignment with conveyor 50 and the pushing device 52. The elevator table 34 pauses in this position, and the device 52 pushes the receptacle and cover onto the conveyor 50 which conveys them through the heating oven 54 to produce a tight seal as indicated in FIGURE 9 due to the shrinkage of the film 12 around the bead 16.

The elevator table 34 returns to its lowermost position where it receives the next receptacle 18a from a feed conveyor 55, in readiness to cover it in a similar manner.

The conveyor 55 may move toward or away from the viewer of FIGURE 6, and pauses when the receptacle 18a is correctly adjacent the elevator table 34. The plunger 55a then pushes the receptacle 18a onto the now empty elevator table 34. The return of plunger 55a to its retracted or rightward position actuates a control which automatically starts the feed rolls 36 to feed another sheet 11a, 12a, over the shelf 38 and to start another covering cycle. Another plunger 55b may reciprocate toward and away from the table 34 simultaneously with the plunger 55a properly to position the receptacle 18a on table 34.

If desired, the tops of beads 16 may have wax or similar material which is rendered temporarily molten or semi-molten within the oven 54 to aid in rendering the seal around the bead 16 effective, and to hold the sheet 11a, 12a in place during the elevating step.

The heating operation in oven 54 temporarily heats the foil 11, film 12 and wax, if used, to a temperature which causes the film 12 to shrink, or to tend to shrink. This causes the film 12a in central zone 20, FIGURE 9, to tend to shrink and to exert an inward pull mainly on the upper edge of the film which surrounds the bead 16. Simultaneously the band 56 of film 12 below the rim 58 of the receptacle 18 also tends to shrink and pull inwardly the lower edge of the film 12 which surrounds the bead 16. These two inward pulling actions, in combination with the slight plasticity of the film 12 at this temperature causes the material of the film 12 to flow into, seal, and adhere to all of the outer surfaces of the bead 16. If wax has been added, the wax flows along the outer surface of the bead 16 and aids in producing a tight seal. After the receptacle 18 leaves the oven 54, the receptacle and cover cool and set the film 12 in sealed condition.

The tendency of the film 12a to shrink in the central zone 20 exerts a strong inward pull on the periphery of the receptacle 18 and tends to bow inward the straight sides 18b and 18c, FIGURE 10, of the receptacle 18. These sides may bow inward a very slight amount, in which case the aluminum foil 11a may wrinkle slightly, as shown in FIGURE 9, while permitting the film 12a to maintain its tight condition. This permits the film 12a to produce a strong pull and to produce an efficient seal around the bead 16.

The flat, horizontal rim 58 of the receptacle 18, FIGURE 7, just inside the bead 16, and surrounding the content cavity 59, aids in preventing any harmful inward bowing of the bead 16 along the sides 18b and 18c. The rim 58 cooperates with the bead 16 in forming a laterally directed "truss" or beam which effectively prevents any harmful inward bowing of the bead 16. The strength of the foil or sheet of the receptacles, in combination with the bead and rim prevents such harmful bowing.

The adhesive applied at the zone 14 between the foil 11 and film 12 may be of varying degrees of adhesiveness. It may be sufficiently adhesive to prevent the foil 11 from being removed from the film 12 at zone 14 without tearing both the foil 11 and film 12. Alternatively, the adhesive may be less and less effective, in varying degrees, until it is only sufficient strong to maintain the foil 11 and film 12 together during the covering operation, but is weak enough to permit the foil 11 to be removed from the film 12 after the covering operation without disturbing or tearing the foil 12 from its sealing position on bead 16 of receptacle 18.

The zone 14 may extend anywhere from substantially the top edge 60 of the bead 16, FIGURE 7, to the outer edge 62 of the severed sheet 11a, 12a. The exact extent or width of such zone may be varied somewhat. For example, the zone 14 may be wide enough to cover only the portions of foil 11a and film 12a which are adjacent the lower surface of rim 58 of receptacle 18, FIGURE 7. Also the zone 14 may be wide enough to cover only from substantially the upper edge of bead 16 to the lower edge of bead 16. Further variations may be provided, as desired.

The methods herein described may be performed with manual tools. The laminated sheet 11a, 12a may be prepared manually by placing the adhesive along the edge of foil 11a which has been cut by shears from a strip of aluminum foil 11 and then placing and pressing the foil 11a on the film 12a which has been sheared from a strip of film 12. The laminated sheet 11a, 12a is then placed over the container 18 and its contents in the position shown in FIGURE 7. The edges of the sheets 11a and 12a are then curled around the bead 16 by hand to the position shown in FIGURE 8. Thereafter the receptacle and cover are heated to the proper temperature in an oven to produce the sealed condition shown in FIGURE 9. The same manual procedure may be used to cover and seal circular receptacles, or receptacles of other various shapes.

Receptacles of circular, oblong, or similar shapes may be covered by apparatus shown in FIGURE 11 by modifying the apparatus of FIGURE 6. The laminated strip 11, 12 is fed toward or away from the viewer of FIGURE 6, or as shown by the arrow 70 in FIGURE 11. A circular pan 72 has an opening 74 corresponding to opening 40 of FIGURE 6, and is movable to the leftward position shown in FIGURE 11 under the sheet 11, 12. The pan 72 is supported and/or moved by the handle 76 to the dotted, rightward position shown in FIGURE 11. The handle 76 is secured to a vertical shaft 77 which is powered to move the pan as herein described. In this rightward position, the opening 74 of pan 72 occupies the same relative position to the elevator table 34 and curling or crimping die 46 which the opening 40 occupies in FIGURE 6. While the pan 72 is in its leftward position under the strip 11, 12, a punching die punches out the laminated circular disc 78 from the strip 11, 12 and drops it over the opening 74 with the edge of disc 78 overlapping opening 74. The strip 11, 12 continues with the punched out openings 78a in it. If desired a depressed flange, not shown, may surround the opening 74 to receive the disc 78 and hold it against lateral movement. After the disc 78 has been dropped on pan 72, the pan 72 moves to its rightward position so the elevator table 34 may move upward through opening 74 and perform the same covering operations in cooperation with die 46 which have been previously described in connection with the rectangular receptacles.

The strip 11, 12, the elevator table 34, the crimping die 46, etc., are modified to receive the circular receptacles and circular disc 78. For example the zone 14 is circular (or oblong or of other proper shape) to fit around the circular bead of such circular receptacles. The table 34 and the crimping die 46 are likewise modified into circular (or oblong etc.) shapes to receive such receptacles.

FIGURES 12-16 disclose further details and stages of operation which may be used in the embodiment of FIGURES 1-10.

Referring first to FIGURE 15, the elevating table of FIGURE 6 may include a main plunger 80 and a sleeve 82. When in the position of FIGURE 15, which is the lowermost position of table 34, the tops 80a and 82a, respectively, of plunger 80 and sleeve 82 are at equal levels. In this position, the table 34 can receive the receptacles 18 as they are fed laterally from the conveyor 55 by the plunger 55a of FIGURE 6, because of the equal level position of the tops 80a and 82a.

In FIGURE 14, the table 34 and receptacle 18 have risen substantially to the level of shelf 38 of FIGURE 6. The sleeve 82 has risen farther than the plunger 80 so the main pressure of the operation on receptacle 18 is taken by the top 82a of sleeve 82 which now supports the rim 58 of receptacle 18, FIGURE 7, and may lift the receptacle slightly above the top 80a. An inverted funnel shaped sleeve 84 guides and centers the receptacle in the opening 40 of shelf 38. The funnel shaped upper end of sleeve 82 also centers the receptacle. A preliminary folding sleeve 86 is movable slightly up and down with respect to shelf 38. When the strip 11, 12 is being fed rightward by rolls 36, the sleeve 86 is raised to permit the passage of the strip 11, 12 under sleeve 86 to a position over opening 40. When the movement of strip 11, 12 is stopped by the electric eye, the sleeve 86 is lowered to hold the strip 11, 12, and the knife 44 is operated to cut the sheet 11a, 12a from the strip. A slipping pressure is then maintained between the shelf 38 and sleeve 86 while the sleeve 82 (with plunger 80 following) moves upwardly into sleeve 86. The periphery of sheet 11a, 12a is folded down around bead 16 by the inverted funnel shaped entrance 88 of sleeve 86, to a position substantially as shown at 11a, 11b, in FIGURE 12.

The table 34, receptacle 18 and cover 11a, 12a proceed upwardly from the position of FIGURE 14 to the position shown in FIGURE 12. During this movement the sleeve 82 moves relatively downwardly with respect to plunger 80 so that by the time they reach the position of FIGURE 12, the tops 80a and 82a are substantially at equal levels. The plunger 80 then pushes the receptacle 18 upwardly so the bead 16 and cover 11a, 12a are against the holding plate 90, which may be downwardly pressed at proper holding pressure by the spring or springs 92. The downwardly folded portion 11b, 12b of the cover is then inwardly folded by the inwardly movable plungers 94 which first inwardly fold opposite sides 11b, 12b of the cover inwardly below the rim 58 of the receptacle 18. After the plungers 94 are retracted, another similar pair of plungers in front and behind the plane of FIGURE 12, respectively, move inward and similarly fold the front and back sides of the cover edge. These last named plungers may have rounded ends to fold the corners 18d, FIGURE 10, of the cover. Such rounded ends may be omitted, and four corner plungers, not shown, may be provided more fully to fold the corners of the cover around the corners of the bead. If desired and after the four plungers 84 have been retracted, the sleeve 82 may be moved upwardly to cause end 82a to move the sides 11b, 12b, upwardly a slight amount as shown in dotted arrows 82b in FIGURE 12.

Alternatively, all of the plungers 94 which surround the receptacle 18 in FIGURE 12 may be moved inwardly simultaneously, and the plungers 94 may be so shaped that they crimp all of the sides and corners 11b and 12b simultaneously.

Thereafter the table 34 moves from the position shown in FIGURE 12 to the position of FIGURE 13. The sleeve 82 moves downwardly with respect to plunger 80 so the tops 80a and 82a are at the same level. The plunger 52 then pushes the covered receptacle 18 onto the conveyor 50 which carries the covered receptacle through the oven 54, FIGURE 6, to cause the sealing action around bead 16 heretofore described.

From the position of FIGURE 13, the conveyor table 34 moves down to the position shown in FIGURE 15 without the receptacle 18 on it, and is ready to receive the next receptacle 18a which is placed thereon by hand or is pushed leftwardly by plunger 55a, FIGURE 6.

FIGURE 16 shows diagrammatically how the plunger 80 and sleeve 82 may be given differential motions. The shaft 83 drives the pair of identical cams 84 and the cam 85. The cams 84 drive the sleeve 82 and the cam 85 drives the plunger 80. Springs, not shown, and/or gravity, as desired, pull the plunger 80 and sleeve 82 down against the cams. The cams are shaped to give the desired differential motion to plunger 80 and sleeve 82. If desired, the sleeve 82 is provided with slots 88 at its lower edge to prevent contact with cam 85.

All of the members of FIGURES 6 and 12-16 may be driven from one or more electric motors, if desired, with proper mechanical gears and/or magnetic clutches, cams, electric eyes, etc., to produce the movements herein described.

For example, in the simplified wiring diagram of FIGURE 17, the lines L—L, are opened and closed by a master manual switch 90 having handle 91. Motor 92 drives the conveyor 55 as long as no receptacle interferes with the light 93 and electric eye relay 94. However when a receptacle 18a intervenes between the light and eye, and when receptacle 18a is in correct position to be moved by plunger 55a, the motor 92 (or magnetic clutch etc.) is stopped by the downward opening of switch 96. The switch 96 then closes the circuit to relay solenoid 97 which pulls up the armature 97a and closes switch 97b, for a purpose to be described. If desired, a combined stop and guide 95 may stop the receptacle 18a and guide it adjacent the table 34 in case of slight over run of conveyor 55. Also, if desired, the switch 96 may be operated directly by contact of receptacle 18a without the use of electric eye 93, 94.

Motor 98 drives the feed rollers 36 and strip 11, 12, by transmission 98a as long as the target 24 is out of line between light 42 and electric eye relay 42a, which relay opens switch 102 and stops motor 98 when target 24 stops the light beams from reaching relay 42a.

Motor 104 runs during one complete covering cycle and then stops. It drives various cams and transmissions diagrammatically indicated by a single emblem at 105, continuously or sequentially to produce the motions of table 34, including plunger 80 and sleeve 82, knife 44, sleeve 86, and plungers 52, 55a, and 94, etc. Motor 107 drives belt 50 continuously under the control of manual switch 108. When the plungers 80, 82 pass downwardly below the shelf 38, the switch 106 is temporarily closed by cam 109 (which is driven by motor 104) a sufficient time only to start motor 98 and to drive the target 24 out of line between light 42 and eye relay 42a. The relay 42a then acts as a holding switch to energize the motor 98 until the next target 24 moves into the light beam and causes relay 42a to open and stop the strip feed when the correct amount of strip 11, 12 has been driven over opening 40.

The motor 104 runs until the plunger 34 reaches its lowermost position, at which time the motor 104 stops by the opening of switch 110 by the cam 112 which cam 112 is driven by transmission or shaft 114 from motor 104. The cam 112 has a very small valley or actuator which will open switch 110 and stop motor 104 when plunger 34 reaches its lowest position, and will cause the switch 110 to close and act as a holding switch during the next receptacle closing cycle immediately after motor 104 is again started by the closing of switch 97b. The motor 104 is started when a receptacle 18a is in correct position on conveyor 55 to be pushed on plunger or table 34. This occurs when the electric eye 93, 94, in response to correct position of receptacle 18a causes switch 96 to move down and energize the solenoid 97 to close starting switch 97b. If a receptacle 18a is already in correct position when the table 34 reaches its lowest position, switch 97b is closed and the motor 104 does not stop but continues to run and repeat the next receptacle closing cycle. However, if no receptacle 18a is already in correct position when table 34 reaches its lowest position motor 104 will stop and wait until a receptacle 18a does reach the correct position. Both switches 110 and 97b will be open and the motor 104 will be deenergized, until such receptacle 18a reaches said correct position.

FIGURE 18 shows another embodiment of the cover curling mechanism. In this embodiment the elevator 34 may have only the plunger 80. The sleeve 86 of FIGURE 14 may be used or may be omitted, as desired. The plate 90a may be the same as in FIGURE 12. The members 94a may be actuated to describe parts of arcs shown in dotted lines 94b, to arrive at dotted positions 94c to curl the cover around the bead 16 and under the rim 58. Similar members in front and behind the plane of FIGURE 18, not shown, may be provided for the front and rear sides of the receptacle 18. Four corner members may also be provided, if desired. These members are moved and retracted so they do not interfere with each other. After they are all retracted, the plunger 80 is lowered, as previously described. The operating faces of the members 94a, and similar members, may be covered with resilient rubber or the like, if desired.

Another embodiment is shown in FIGURES 19 to 28. In this embodiment the receptacles 18 have covers 11a, 12a applied thereto by a continuous operation.

A belt 200 carries a series of molds 202 continuously past the pulleys 204 and 206. The receptacles 18 are fed by any suitable feeding mechanism onto the elevating platforms 208 substantially at the zone 210. The belt 200 travels leftward at the top, in FIGURE 19, and the molds with the receptacles 18 therein arrive at a cover applying zone 212 where the covers 11a and 12a are applied to the leading edge of the receptacle 18, so that the leading edge of the covers are curled around leading edge or bead of the receptacle, as indicated along the zone 214. Thereafter the receptacles in the molds arrive at the cover crimping zone 216 where the covers are crimped around the bead of the receptacles. Thereafter the belt and molds carry the covered receptacle to a heating zone 218 where the covers 11a, 12a are heated to cause the film 12 to shrink or contract as previously described. At this time the covers 11a and 12a are pressed downwardly against the receptacles in the heating zone around the perimeter of the container with the cover curled about the bead so as to insure that the film 12 does not shrink so rapidly so as to completely pull the film from under the bead and flange during the cycle when heat is applied. The receptacles are then removed from the heating zone 218 and are discharged onto a discharge conveyor 220 to the place of use, packing zone, and the like.

The elevating platforms 208 are carried by the elevating rods 222. The rods 222 are actuated up and down, or maintained temporarily stationary by the stationary platform 224. This platform 224 determines whether the receptacles 18 shall travel within the pocket 226 of the molds 202, or whether they shall be elevated above the pocket 226 at the zones 212, 216 and adjacent to the discharge conveyor 220 as will become apparent.

In the cover applying zone 212, the laminated sheet 9 leaves the roll 10, as in previous embodiments, passes through the guide rolls 228 and is pulled by the feed rolls 230 and 232. At proper intervals, or length of feed, the laminated sheet 9 is cut by the knife construction 234 to provide laminations of the proper dimension, as indicated at 11a, 12a. The lower end of the cover 11a, 12a is curled around the leading edge or bead 16 of the receptable 18, FIGURE 22, by means of the forked lever 236, which is carried by and operated by the shaft 238. The shaft 238 governs the rate of travel of the fork 240, so that it is delayed slightly to cause the leading edge 16 to force its way, with the edge of the cover 11a, 12a into the fork 240 in a manner to curl the cover around the bead 16. Thereafter the lever 236 is operated, so that the fork 240 travels faster than the receptacle 18, so the fork 240 leaves the bead 16, and arrives at the position 236a, shown in dotted lines in FIGURE 22. This permits the receptable, with the cover curled around its leading edge, to travel leftward with the belt, as indicated in FIGURE 19. The platform 208 is raised by a hill 245 in platform 224 which raises the rod 222 while it passes through zone 212.

While the cover is being applied to the bead 16, in FIGURE 22, a plate or rod 242 is elevated by a second stationary platform 244, which has a hill at 246 which elevates the rod 242 temporarily in the zone 212 to prevent the receptacle 18 from being forced backward from the mold 202, in FIGURE 22. The rod 242 is carried by the mold 202 at the rear portion of the mold, and is adapted to be retracted or be lowered as the hill 246 terminates or descends at 248. The fork lever 236 is returned to the position shown in FIGURE 22 in readiness to receive the next receptacle as it arrives at the zone 212. The platforms 224 and 244 are spaced laterally of each other, so as not to interfere with the operation of the rods 222 and 242 respectively.

While the receptacles 18 are traveling through the zone 212, they are elevated above the mold 202 by means of the hill 245 in the platform 224 a sufficient length of time to permit the leading edge of the bead to be engaged by the cover as heretofore described. Thereafter the receptacles 18 and the platform 208, which support the receptacle are lowered during the time that they travel from the zone 212 to the zone 216. As the receptacles arrive at the zone 216, they are elevated by the hill 250 to introduce the receptacles into the crimping die 252 which has arrived at a position in its circular travel to receive the receptacle which is being elevated by the hill 250.

At this time the crimping die 252 is caused to crimp all of the edges of the cover 11a, 12a around the bead 16 of the elevated receptacle by means of the stationary cam 254 in a manner to be more fully described. Thereafter the covered receptacle is lowered by the descent of the hill 250, so that the receptacles 18 are within the pocket 226 of the molds while the receptacles pass through the heating zone 218. At this time the covers of the receptacles are pressed downwardly by a pressure belt 256 which holds the covers firmly against the beads of the receptacles to insure that the film does not shrink so rapidly as to completely pull the film from under the bead and flange during the heating cycle. Thereafter the receptacles are again raised by the hill 257, so that the receptacles 18 may be discharged onto the discharge conveyor 220 as the molds 202 pass around the pulley 204.

The action which takes place in zone 216, where the covers are crimped around the receptacles, is more fully shown in FIGURES 23 to 26 and 28. A turret wheel 258, FIGURE 23, is driven to rotate about the axis 260, FIGURE 20. The wheel 258 carries a plurality of turrets 262 each of which supports a crimping die 252, so that each crimping die is continuously maintained in proper vertical alignment notwithstanding the rotation of the turret wheel 258. The crimping die 252 may be supported by a block 264 which is keyed or bolted at 266 to the turret 262, while both the turret 262 and block 264 rotate about the pin or axis 270 which is rotatably mounted on the turret wheel 258. The turret 262 is given the proper relative movement with respect to the turret wheel 258 by the small gear wheel 272 which is carried by the turret wheel 258 on the shaft 274. The gear wheel 272 gears or meshes with the turret 262 and with the internal teeth 276 of a compensating wheel 278 which is rotated about axis 260 at a speed which is effective to maintain the dies 252 continuously in the vertical position.

Just before each receptacle 18 reaches a position directly under the lowermost point of travel of the die 252, the receptacle 18 is within the pocket 226 of the mold 202, as shown in FIGURE 24. At this time the platform 224 is not raised, and the rollers 280 at the bottom of the rods 222 maintain the platform 208 at its lowest position, and the receptacle 18 had not been moved into the die. The die has a lower plate 282 and an upper plate 284 which is movable downwardly with respect to the plate 282 at the proper time to cause the die 252 to perform a crimping operation. In FIGURE 24, the die is in readiness to receive the receptacle 18 but has not yet received such receptacle. In FIGURE 25, the receptacle 18 has been moved into the die 252 by operation of the hill 250 which has raised the rod 222 and caused the platform 208 to raise the receptacle 18 into the die. However, at this time the cam 254 has not pushed down the upper plate 284 relatively to the lower plate 282 of the die. This upward movement of the receptacle 18, however, has caused the cover 11a, 12a, to have its edge 286 curled downwardly around all sides by means of the stationary curling lips 288 which is stationarily carried by the lower plate 282. At this time the lower plate 282 has its wheels 290 supported by the straight track 292. The cams 254 are about to engage the actuating wheels 294 which are supported on the upper plate 284 by the bearing plates 296 which are secured to the upper plate 284.

Figure 26:
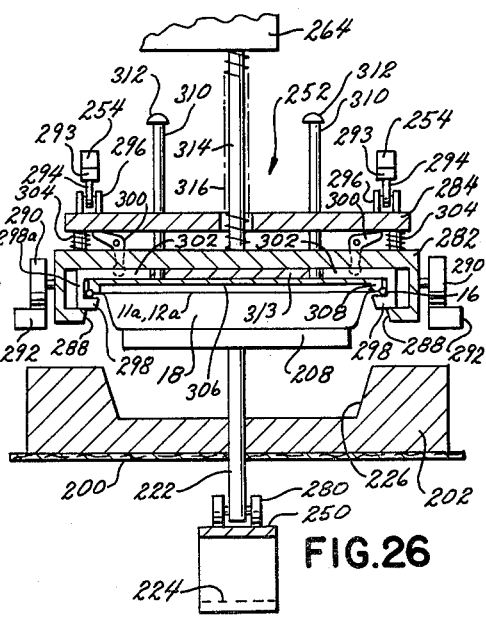
FIGURE 26 shows a step subsequent to that of FIGURE 25.
Figure 28:
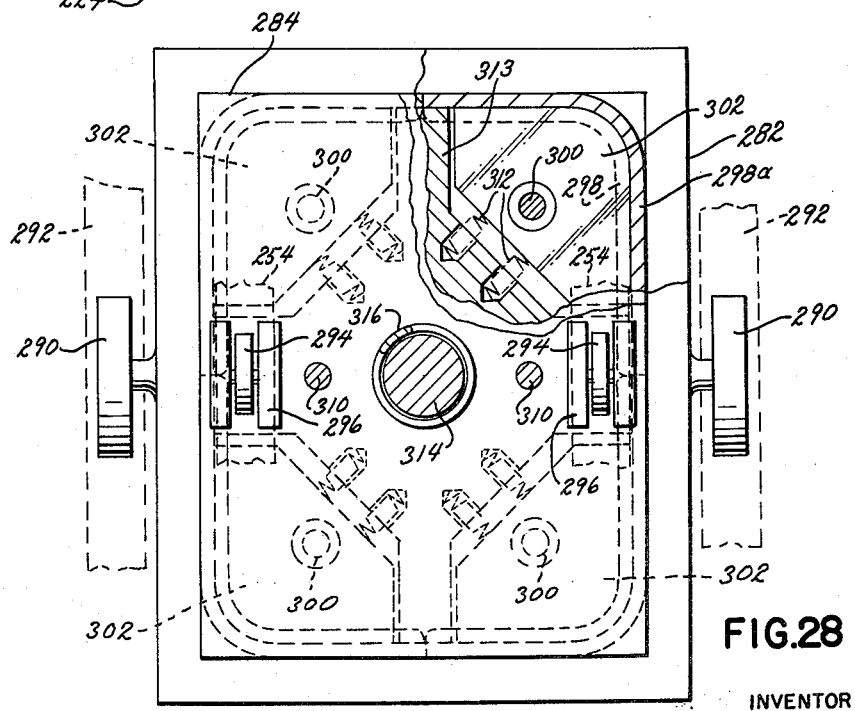
FIGURE 28 is an enlarged plan view of the die.

FIGURE 26 shows the crimping operation of the die 252. The platform 208 is maintained in its uppermost position by the hill 250, the lower plate 282 is maintained at its temporarily fixed level by the wheels 290 and the trackways 292. The upper plate 284, however, has been lowered relatively to the lower plate 282 by the action of the cams 254 which at this time had forced down the wheel 294 and the upper plate 284 by the slanting wall 293, FIGURES 20 and 26. This action causes four corner crimping lips 298 to move inwardly from their outward position in FIGURE 25 to curl or crimp the edges of the cover 11a, 12a completely around the bead of the receptacle. This action is produced by the movement of the bell crank levers 300 which are fulcrumed on the lower plate 282 but which are rocked by the downward movement of the upper plate 284. The lower ends of the bell crank lever 300 engage the slidable plates 302 which carry the corner crimping lips 298 and which are slidably supported from the lower plate 282.

Thereafter, the die 252 and the plate 18 move leftward beyond the action of the hill 250 and the cam 254, so that the elevating platform 208 is lowered into the pocket 226 of the mold 202, the plate 284 is raised by reason of the passing beyond the action of the cam 254, and by the action of compression springs 304, so that the corner crimping lips 298 are moved outwardly, and the receptacle 18 is allowed to lower with the platform 208 to a position substantially the same as illustrated in FIGURE 24. Because of this identity such position is not again illustrated. Thereafter the particular crimping die which has been considered in connection with these figures, is elevated to the position 252a, FIGURE 19, while the mold and receptacle in question proceed to advance into the heating zone 218, which is encompassed by the heating tunnel 307 where the covers are pressed down into the receptacles 18 while the lamination is being heated, and the film is shrinking, as previously described. As the receptacles leaves the tunnel 307, they are again elevated by the hill 257, so they may be discharged into the discharge conveyor 220 as the molds 202 travel around the pulley 204.

Reverting again to details of the crimping die 252, such crimping die is provided with a pressure plate 306 which has a downward flange 308 and is shaped to engage the bead 16 of the receptacle 18. The pressure plate 306 is carried by two slidable rods 310 which are secured to the pressure plate 306 at the bottom, and have heads 312 at their upper end and are slidable through the plates 282 and 284. When the die 252 is in the position of FIGURES 23–24 the pressure plate 306 is in its lower position and the heads 312 rest on the upper plate 204. In this position, the pressure plate 306 is adapted first to engage the cover 11a, 12a, before such cover is forced into the die 252. The pressure plate 306 holds the cover in position while the cover is being forced past the curling lip 288, so that the cover is not displaced. When the receptacle and cover are raised to the positions of FIGURES 25 and 26, the pressure plate 306 rises with them and the slidable rods 310 rise to the position shown in these FIGURES 25 and 26. Further details of this die include vertical members 298a which carry the lips 298 from the slidable members 302. The slidable members 302 are pressed outwardly by springs 312' which are partly imbedded in the stationary member 313' within the die.

The die 252 is supported from the block 264 by a rod 314 which is secured to the lower platform 282, and which passes loosely through the upper plate 284. A spring 316 surrounds the rod 314 and extends between the block 264 and the plate 282. A nut 318 limits the downward movement of the rod 314, but permits upward movement if necessary.

The spacing of the molds 202 from each other on the belt 200 and the spacing of the dies 252 on the turret wheel 258 is to be coordinated so that a mold 202 correctly meets a die 252 during the short horizontal travel in the zone of the hill 250 where the mold and die travel substantially at the same speed.

The construction of FIGURES 19 to 26 and 28 is applicable for the covering of receptacles with cover material which does not necessarily include both the foil 11 and the film 12. Any type of sheet material may be applied to cover the receptacles by this construction, such as aluminum foil, without the film, which can be used as cover material for aluminum receptacles and the like. It is also applicable to paper and plastic receptacles and covers.

FIGURE 27 shows a ball shaped oven 320 which may have a heated rim 322 for heating the rim of the covers and receptacles instead of the oven 306 of FIGURE 20. A plurality of these ovens 320 may be mounted on a turret type of construction such as shown in FIGURE 20, and the rims 322 may come directly downward around the entire rim of the receptacles all at the same time. The heating means may be inside of each ball and may also be applied near the rim 322 if desired. The construction is such that the cover is pressed downwardly on the bead of the receptacle, while it rests on the mold 202 to insure that the film does not shrink too rapidly and completely pull the film from under the bead and flange of the receptacle.

In the operatiton of the construction shown in FIGURES 19 to 28, a series of molds 202 continuously travel along with the belt 200. The molds 202 are provided with elevating platforms 208 in which each of the supporting rods 222 may be surrounded by a spring, not shown, which bears upwardly against the belt 200 or mold 202 and downwardly against a pin or washer, not shown, which is secured to the rod 222 with sufficient force to maintain the platform 208 in the pocket 226 when not pushed upwardly by the platform 224. Empty receptacles are placed in the molds 202 at the zone 210 by any suitable heating mechanism. These receptacles may have their contents inserted therein previously or while they are still on the conveyor of this apparatus. The molds and receptacles advance leftward in FIGURE 19 until they reach the zone 212. Here the receptacles are elevated by the platforms 208 which are raised by the action of the hill 245, so that the forked lever 236 may curl the end of the cover 11a, 12a, FIGURE 22, around the bead 16, as it moves leftward. The cover 11a, 12a is cut by the knife construction 234 for proper size. The cover is advanced by power driven rollers 230 and 232 which act within the sleeve 324 which guides the cover material to feed the cover to engage the receptacle 18. The forked lever 236 curls the lower end of the cover around the leading edge 16 of the receptacle 18, and then the lever 236 is moved upwardly out of contact with the receptacle 16 and the receptacle continues leftward in lowered position until it reaches the zone 216. Here the receptacle is moved upwardly by the hill 250 at the time that a die 252 is ready to receive it. The die is operated to crimp the cover around all sides by the cam 254. Thereafter the receptacle is lowered as it travels leftward and passes through a heating zone 218 which may have the oven 306 with the pressure belt 256, or the ball shaped ovens 320 with the heated rims 322, these ovens being operated similarly to the turret construction of dies 252, so that the rims of the covers are heated and the film is shrunk for hermetically sealing the contents within the receptacle. Thereafter the receptacles and covers are elevated again after they leave the heating zone 218 and are discharged at 220 onto the discharge conveyor, as the molds 202 pass the pulley construction 204 of the belt.

A new, useful and efficient method, apparatus and product are thus provided which are particularly adapted to high speed, automatic production. Receptacles are covered and sealed by the heat shrinkable film 12, which is protected by the foil 11. This foil may be removed without breaking the seal of film 12 if desired. The foil 11 may be removed entirely, or it may be broken inside the zone 14 and partially removed, as desired.

Many of the advantages of this invention are applicable for covering receptacles which have no rim 58, but do have bead 16. In certain cases, the invention is applicable for covering of receptacles with the rim 58 and have no bead 16, and for the covering of receptacles without both the rim 58 and the bead 16.

While the embodiment and form of the invention now preferred has been disclosed in accordance with the requirements of the statute, other forms may be used, all coming within the scope of the claims which follows.

What is claimed is:

1. The method of covering a series of receptacles having opening perimeters which comprises: forming a strip with a protective outer foil and a heat shrinkable inner film in which the foil and film are secured together only in a series of zones substantially corresponding in pattern to said opening perimeters, said foil and film being free from each other inside said zones; severing said strip into sheets each provided with one of said zones and being of a size to cover one of said openings; serially placing said sheets with said zones adjacent said perimeters; curling said sheets around said perimeters; and heating said receptacles when covered by sheets to cause the central portion of said film to pull and seal said film to said perimeters.

2. An apparatus for covering a series of receptacles having opening perimeters which comprises: means for forming a strip with a protective outer foil and a heat shrinkable inner film with the foil and film secured together only in a series of zones substantially corresponding in pattern to said opening perimeters, said foil and film being free from each other inside said zones; means for severing said strip into sheets each provided with one of said zones and being of a size to cover one of said openings; means for serially placing said sheets with said zones adjacent said perimeters, means for curling said sheets around said perimeters; and means for heating said receptacles when covered by said sheets to cause the central portion of said film to pull and seal said film to said perimeters.

3. The method of covering a series of receptacles having opening perimeters which comprises: longitudinally feeding a protective foil strip; longitudinally feeding a heat shrinkable film strip adjacent said foil strip; applying adhesive to one of said strips in a series of zones substantially corresponding in pattern to said opening perimeters free from adhesive inside said zones; pressing said strips together adhesively to secure said strips to each other along said zones; severing said adhesively secured strips into sheets each provided with one of said zones and being of a size to cover one of said openings; placing said sheets respectively against said perimeter openings to cover said receptacles; and heating said covered receptacles to cause the heat shrinkable film in said sheets to adhere to said opening perimeters.

4. An apparatus for covering a series of receptacles having opening perimeters which comprises: means for longitudinally feeding a protective foil strip; means for longitudinally feeding a heat shrinkable film adjacent said foil strip; means for applying adhesive to one of said strips in a series of zones substantially corresponding in pattern to said opening perimeters with the inside of said zones being free of adhesive; means for pressing said strips together adhesively to secure said strips to each other along said zones; means for severing said adhesively secured strips into sheets each provided with one of said zones and being of a size to cover one of said openings; means for placing said sheets respectively against said perimeter openings to cover said receptacles; and means for heating said covered receptacles to cause the heat shrinkable film in said sheets to adhere to said perimeters.

5. An apparatus for covering a series of receptacles having opening perimeters which comprises: means for forming a strip with a protective outer foil and a heat shrinkable inner film with the foil and film secured together only in a series of zones substantially corresponding in pattern to said opening perimeters, said foil and film being free from each other inside said zones; a cutter; feeding means for longitudinally feeding said strip in progressive steps with an edge of each of said zones adjacent said cutter; means for progressively operating said cutter serially to cut said strip along said edge of each of said zones to produce sheets each provided with one of said zones; elevating means serially to elevate said receptacles with said opening perimeters respectively engaging the film of said sheets at said zones; curling means serially to curl the outer edge of said sheets around said opening perimeters when elevated by said elevating means loosely to cover said receptacles; heating means; and means to transfer said covered receptacles from said elevating means into contact with said heating means.

6. An apparatus for covering a series of receptacles having opening perimeters which comprises: means forming a strip with a protective outer foil and a heat shrinkable inner film with the foil and film secured together only in a series of zones substantially corresponding in pattern to said opening perimeters, said foil and film being free from each other inside said zones; a cutter; automatic feeding means for automatically longitudinally feeding said strip in progressive steps with an edge of each of said zones adjacent said cutter; automatic cutter operating means for automatically and progressively operating said cutter serially to cut said strip along said edge of each of said zones into a plurality of sheets; automatic elevating means serially to elevate said receptacles with said opening perimeters respectively engaging the film of said sheets at said zones; automatic curling means serially and automatically to curl the outer edge of said sheets around said opening perimeters when elevated by said elevating means loosely to cover said receptacles; heating means; and automatic transfer means automatically to transfer said covered receptacles from said elevating means into contact with said heating means.

7. An apparatus for covering a series of receptacles having opening perimeters which comprises: means forming a strip with a protective outer foil and a heat shrinkable inner film with the foil and film secured together only in a series of zones substantially corresponding in pattern to said opening perimeters, said foil and film being free from each other inside said zones; a cutter; feeding means for longitudinally feeding said strip in progressive steps with an edge of each of said zones adjacent said cutter; means for progressively operating said cutter serially to cut said strip along said edge of each of said zones into a plurality of sheets; elevating means serially to elevate said receptacles with said opening perimeters respectively in engagement with the film of said sheets at said zones; curling and sealing means serially to curl and seal the outer edge of said sheets around said opening perimeters when elevated and including heating means and means to bring said receptacles and curled sheets into contact with said heating means.

8. An apparatus for covering a series of receptacles having opening perimeters with a strip having a protective outer foil and a heat shrinkable inner film with the foil and film secured together only in a series of zones substantially corresponding in pattern to said opening perimeters, said foil and film being free from each other inside said zones, which apparatus comprises: a cutter; feeding means for longitudinally feeding said strip in progressive steps with an edge of each of said zones adjacent said cutter; means for progressively operating said cutter serially to cut said strip along said edge of each of said zones into a plurality of sheets; elevating means serially to elevate said receptacles with said opening perimeters respectively in engagement with the film of said sheets at said zones; curling and sealing means serially to curl and seal the outer edge of said sheets around said opening perimeters when elevated and including heating means; and means to transfer said covered receptacles from said elevating means into contact with said heating means.

9. An apparatus for covering a series of receptacles having opening perimeters with a flat horizontal rim and a bead secured to and surrounding said rim, which apparatus comprises: means forming a strip with a protective outer foil and a heat shrinkable inner film with the foil and film secured together only in a series of zones substantially corresponding in pattern to said opening perimeters, said foil and film being free from each other inside said zones; a cutter; feeding means for longitudinally feeding said strip in progressive steps with an edge of each of said zones adjacent said cutter; means for progressively operating said cuttter serially to cut said strip along said edge of each of said zones into a plurality of sheets; elevating means serially to elevate said receptacles with said opening perimeters respectively in engagement with the film of said sheets at said zones; curling and sealing means serially to curl the outer edge of said sheets around said bead when elevated and including heating means and means to bring said receptacles and curled sheets into contact with said heating means.

10. A method for covering a series of receptacles having opening perimeters with a flat horizontal rim and a bead secured to and surrounding said rim, which method comprises: forming a strip with a protective outer foil and a heat shrinkable inner film with the foil and film secured together only in a series of zones substantially corresponding in pattern to said opening perimeters, said foil and film being free from each other inside said zones; feeding said strip in progressive steps with an edge of each of said zones adjacent a cutter; progressively operating said cutter serially to cut said strip along said edge of each of said zones into a plurality of sheets; elevating said receptacles with said beads respectively engaging the film of said sheets at said zones; curling the outer edge of said sheets around said beads when elevated by said elevating means; and heating said covered receptacles to seal said film to said beads.

11. A method covering a series of receptacles having opening perimeters with a strip having a protective outer foil and a heat shrinkable inner film with the foil and film secured together only in a series of zones substantially corresponding in pattern to said opening perimeters, said foil and film being free from each other inside said zones; which method comprises: feeding said strip in progressive steps with an edge of each of said zones adjacent a cutter; progressively operating said cutter serially to cut said strip along said edge of each of said zones into a plurality of sheets; elevating said receptacles with said opening perimeters respectively engaging the film of said sheets at said zones; curling the outer edge of said sheets around said opening perimeters when elevated; and heating said covered receptacles to seal the film of said sheets to said opening perimeters.

12. An apparatus for covering a series of receptacles having opening perimeters which comprises: means for feeding a strip with a protective outer foil and a heat shrinkable inner film with foil and film secured together only in a series of zones substantially corresponding in pattern to said opening perimeters, said foil and film being free from each other inside said zones; means for severing said strip into sheets each provided with one of said zones and being of a size to cover one of said openings; a belt conveyor; receptacle holding means on said conveyor; means for applying one of said sheets to each of said receptacles on said holding means as said receptacles pass a cover applying zone; receptacle elevating means in said holding means; a cover wrapping die supporting means supporting a series of wrapping dies movable in an orbit adjacent a cover wrapping zone of travel of said holding means on said conveyor; means for elevating said elevating means during the travel of said holding means in said cover wrapping zone to introduce receptacles and covers into said wrapping dies as said receptacles pass said wrapping zone; and means for operating said dies to wrap said covers on said receptacles as said receptacles pass said wrapping zone; heating means to heat said wrapped covers after said covers have been wrapped on said receptacles; and means to press said covers on said perimeters while said covers are being heated.

13. An apparatus for covering a series of receptacles having opening perimeters which comprises: means for feeding a plurality of sheets each having a protective outer foil and a heat shrinkable inner film with foil and film secured together only in a zone substantially corresponding in pattern to said opening perimeters, said foil and film being free from each other inside said zone and being of a size to cover said openings; an orbital conveyor; receptacle holding means on said conveyor; means for applying one of said sheets to each of said receptacles on said holding means as said receptacles pass a cover applying zone; a cover wrapping die supporting means supporting a wrapping die movable in an orbit adjacent a cover wrapping zone of travel of said holding means on said conveyor; means for causing relative movement between said die and said receptacles with covers during the travel of said holding means in said cover wrapping zone to introduce receptacles with covers into said wrapping die as it passes said wrapping zone; and means for operating said die to wrap said covers on said receptacles as said die passes said wrapping zone; and heating means to heat said wrapped covers after said covers have been wrapped on said receptacles.

14. An apparatus for covering a series of receptacles having opening perimeters which comprises: means for feeding a plurality of sheets of bendable material and being of a size respectively to cover said openings; an orbital conveyor; receptacle holding means on said conveyor; means for applying one of said sheets respectively to said receptacles on said holding means as said receptacles pass a cover applying zone; a cover wrapping die supporting means supporting a wrapping die movable in an orbit adjacent a cover wrapping zone of travel of said holding means on said conveyor; means for causing relative movement between said die and said receptacles with covers during the travel of said holding means in said cover wrapping zone to introduce receptacles with covers into said wrapping die as it passes said wrapping zone; and means for operating said die to wrap said covers on said receptacles as said die passes said wrapping zone.

15. An apparatus for covering a series of receptacles having opening perimeters which comprises: means for feeding a plurality of sheets of bendable material and being of a size respectively to cover said openings; a vertical orbit conveyor; receptacle holding means on said conveyor; means for applying one of said sheets respectively to said receptacles on said holding means as said receptacles pass a cover applying zone; a cover wrapping die supporting means supporting a wrapping die movable in a vertical orbit adjacent a cover wrapping zone of travel of said holding means on said conveyor; means for causing relative movement between said die and said receptacles with covers during the travel of said holding means in said cover wrapping zone to introduce receptacles with covers into said wrapping die as it passes said wrapping zone; and means for operating said die to wrap said covers on said receptacles as said die passes said wrapping zone.

16. An apparatus for covering a series of receptacles having opening perimeters which comprises: means for feeding a plurality of sheets of bendable material and being of a size respectively to cover said openings; a belt conveyor; receptacle receiving molds on said conveyor; means for applying one of said sheets respectively to said receptacles in said molds as they pass a cover applying zone; receptacle elevating means in said molds; a cover wrapping die supporting means supporting a series of wrapping dies movable in a vertical orbit adjacent a cover wrapping zone of travel of said molds on said conveyor; means for elevating said elevating means during the travel of said molds in said cover wrapping zone to introduce receptacles and covers into said wrapping dies as they pass said wrapping zone; and means for operating said dies to wrap said covers on said receptacles as said dies pass said zone.

17. An apparatus for covering a series of receptacles having opening perimeters which comprises: means for feeding a strip of bendable material; means for severing said strip into sheets each being of a size to cover one of said openings; a belt conveyor; receptacle receiving molds on said conveyor; means for serially feeding said sheets vertically with an edge of each sheet respectively in front of the front receptacle edges of the horizontally advancing receptacles in said molds; means for curling said edges of said sheets respectively around the said front receptacle edges to cause said sheets to lay on said perimeters of said receptacles; receptacle elevating means in said molds; a cover wrapping die supporting means supporting a series of wrapping dies movable in an orbit adjacent a cover wrapping zone of travel of said molds on said conveyor; means for elevating said elevating means during the travel of said molds in said cover wrapping zone to introduce receptacles and covers into said wrapping dies as they pass said wrapping zone; and means for operating said dies to wrap said covers on said receptacles as said dies pass said wrapping zone.

18. An apparatus according to claim 2 in which means are provided for pressing said sheets against said perimeters to prevent said central portion of said film from pulling said film completely away from said perimeters while said receptacles are being heated.

19. An apparatus according to claim 17 in which a movable forked arm is provided for curling said edges of said sheets respectively around said front receptacle edges.

20. A method covering a series of receptacles having opening perimeters with a strip having a protective outer foil and a heat shrinkable inner film with the foil and film secured together only in a series of zones substantially corresponding in pattern to said opening perimeters, said foil and film being free from each other inside said zones; which method comprises: feeding said strip in progressive steps with an edge of each of said zones adjacent a cutter; progressively operating said cutter serially to cut said strip along said edge of each of said zones into a plurality of sheets; and advancing said series of receptacles horizontally; serially feeding said sheets vertically with an edge of each sheet respectively in front of the front receptacle edges of said series of horizontally advancing receptacles; and curling said edges of said sheets respectively around the front receptacle edge to cause said sheets to lay on said perimeters of said receptacles.

References Cited in the file of this patent

UNITED STATES PATENTS

| | | |
|---|---|---|
| 1,715,349 | Bodman | June 4, 1929 |
| 1,956,214 | Booth | Apr. 24, 1934 |
| 2,285,220 | Morrell | June 2, 1942 |
| 2,732,116 | Merrill | Jan. 24, 1956 |